Dec. 1, 1953  E. H. LEFFLER  2,661,016
RELIEF VALVE OF THE POPPET TYPE
Filed Nov. 4, 1949
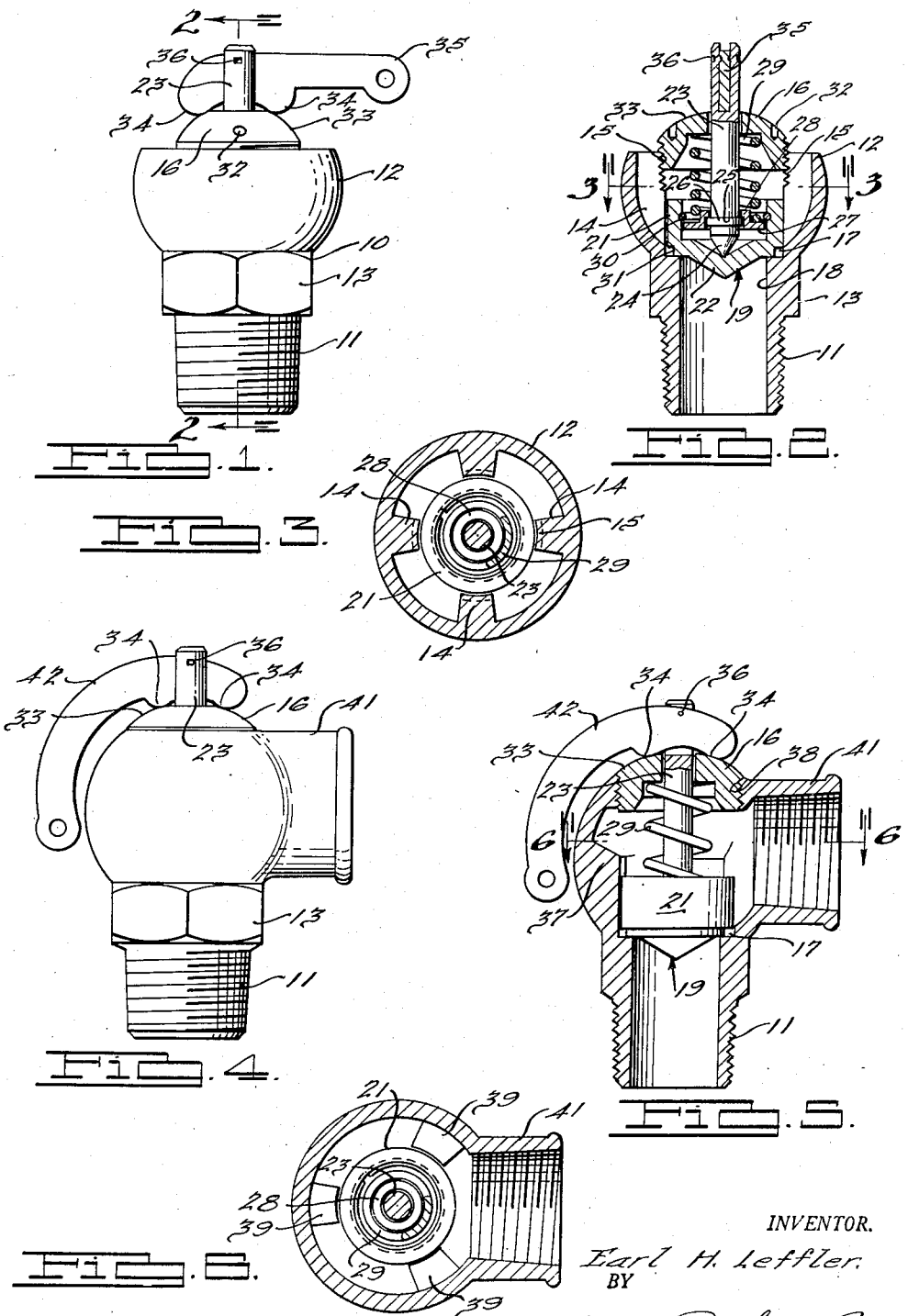
INVENTOR.
Earl H. Leffler,
BY
Harness, Dickey & Pierce
ATTORNEYS.

Patented Dec. 1, 1953

2,661,016

UNITED STATES PATENT OFFICE 2,661,016

RELIEF VALVE OF THE POPPET TYPE

Earl H. Leffler, Dearborn, Mich., assignor to Consolidated Brass Company, Detroit, Mich., a corporation of Michigan Application November 4, 1949, Serial No. 125,480

8 Claims. (Cl. 137—469)

1

This invention relates to relief valves of the poppet type, and particularly to the poppet type of valve which has a quick action for relieving the pressure in a confined tank or system.

The poppet valve of the present invention provides accurate relief at a predetermined pressure and large passageways for the escape of the pressure fluid. The valve consists of a body having a threaded end by which it is secured in the system or to a tank or other closed device requiring a safety relief valve. A semicylindrical wall extends outwardly and upwardly from the threaded end and is provided with a plurality of fins for guiding the check valve and providing threads for adjustably securing a cap which retains a spring compressed to a desirable adjusted amount. The spring urges the check valve upon its seat against the pressure of the fluid. A valve seat is provided at the junction of the semicylindrical wall and the threaded end engaged by a flat cylindrical seat on the check valve. The check valve has a cylindrical wall and a conical end into which the end of a stem projects when the check valve is supported thereon for universal movement. A washer having a shoulder resting on a flange on the stem prevents the washer from moving downwardly thereover. The check valve is supported over the washer by a spring ring expanded into a slot in the inner wall of the check valve. The check valve is universally supported in this manner on the end of the stem and the stem extends through the cap and is pivoted to a lever which is supported on the cap in a manner to raise the stem when the lever is moved downwardly or upwardly. The lever permits a manual actuation of the valve when such actuation is desired. Through the provision of the proper spring and the adjustment of the cap, the opening of the valve will be produced when a predetermined pressure is reached within the tank or confined system.

The valve similarly may be constructed to have the fluid relieved thereby pass from the valve body at right angles to the stem rather than when directed upwardly in line therewith as in the first mentioned structure. In this arrangement, a wall of vertical shape extends upwardly from the threaded valve stem, having at the top a threaded opening for receiving the cap which is adjusted therein and having a cylindrical threaded outlet extending at right angles to the passageway to the threaded stem. The check valve and the valve stem are similar to that above described, the check valve resting upon a valve seat in the valve body operated by a lever which may be moved to raised or lowered position.

2

The check valve has a shouldered recess about its seat which forms a poppet chamber with the shoulder of the seat in the valve body so that as the pressure approaches the amount required to raise the check valve, a large quantity of the fluid under pressure will pass within the poppet chamber and, due to the increase in the area to which the force is applied, the check valve will pop open against the tension of the spring. This permits the rapid opening of the check valve at the desired pressure and the immediate escape of a large volume of pressure fluid as it escapes through the large passageways between the guide fins within the semicyclindrical or cylinder wall.

Accordingly, the main objects of the invention are: to provide a poppet valve which snaps open when a pressure is reached for which the valve is calibrated; to provide a poppet valve having a quick-acting check valve which forms a poppet chamber with the valve body above which large openings are provided for the rapid release of the pressure fluid; to provide a valve body with a threaded end and a spherical or semispherical wall containing spaced fins for guiding the check valve and a thread for supporting a cap by which the spring disposed between the cap and the check valve may be adjusted to accurately calibrate the valve; to provide a rapid-acting check valve with large escape passages for the fluid which may escape upwardly or which may be directed at an angle to the axis of the valve; and, in general, to provide a poppet valve of the quick-acting type which is simple in construction, positive in operation and economical of manufacture.

Other objects and features of novelty of the invention will be specifically pointed out or will become apparent when referring, for a better understanding of the invention, to the following description taken in conjunction with the accompanying drawing, wherein:

Figure 1 is a view in elevation of a quick-acting poppet valve embodying features of the present invention;

Fig. 2 is a sectional view of the poppet valve illustrated in Fig. 1;

Fig. 3 is a sectional view of the structure illustrated in Fig. 2, taken on the line 3—3 thereof;

Fig. 4 is a view in elevation of a quick-acting valve, similar to that illustrated in Fig. 1, showing a further form thereof;

Fig. 5 is a vertical sectional view of the structure illustrated in Fig. 4, and

Fig. 6 is a sectional view of the structure illustrated in Fig. 5, taken on the line 6—6 thereof.

A quick-acting poppet valve is illustrated in

Figs. 1, 2 and 3, comprising a valve body 10 having a threaded inlet end 11 by which the valve body is connected to a tank, system or other device in which pressure may be generated. A semicylindrical wall 12 extends outwardly and upwardly of the end 11. Between the end 11 and the wall 12, a hexagonal portion 13 is provided for the reception of a wrench by which the threaded end 11 may be screwed into and out of a fitting. Guide fins 14 project inwardly from the inner surface of the semicylindrical wall 12, the radial ends of which fall upon the surface of a cylinder. The upper part of the fins is provided with a thread 15 to which a cap 16 is threaded.

A shoulder 17 is provided between the aperture 18 through the end 11 and the bottom of the inner surface of the semicylindrical wall 12. The shoulder 17 provides a seat for a valve 19 having cylindrical walls 21 and a conical end 22. An operating stem 23 projects through an aperture in the cap 16 and is provided with a tapered end 24 which engages the inner apex of the conical end 22. An annular slot 25 is provided in the wall of the stem above the conical end 24 in which a U-shaped washer 26 may be secured for supporting a shouldered washer 27 which locks the washer upon the stem due to the offset shoulder portion 28 thereof. A spring ring 30 is expanded into a slot in the inner surface of the cylindrical wall 21 of the valve 19 above the shouldered washer 27 for locking the valve onto the stem 23. A spring 29 is disposed between the shouldered washer 27 and the cap 16 for applying a bias to the valve 22 which is adjusted by the adjustment of the cap on the threads 15 of the vanes.

The lower portion of the vanes accurately guides the cylindrical wall 21 of the valve to prevent it from tilting any great amount while permitting it to adjust itself upon the seat formed by the shoulder 17. A shoulder 31 is provided at the lower end of the cylindrical wall 21 of the valve 19 for the purpose of forming an annular chamber with the shoulder 17 in the valve body so that as the pressure within the passageway 18 through the body increases an amount sufficient to overcome the tension of the spring 29, the pressure will first enter the chamber 17 and, due to the increase of area upon which the pressure is applied, will immediately snap the valve 19 to open position. When this occurs, the large passageways provided between the guide fins 14 permit the rapid escape of the pressure fluid and the lowering of the pressure within the tank or system to a point at which the tension of the spring 29 will force the valve 27 upon its seat.

Spanner wrench apertures 32 are provided in the cap 16 by which the cap may be adjusted on the vanes. The cap has an arcuate surface 33 on the top with which cam projections 34 on a manually operating lever 35 engage. The stem 23 is raised when the lever 35 is pivoted upwardly or downwardly upon pin 36 which connects the lever to the stem at the bifurcated upper end thereof.

In Figs. 4 and 5, a similar valve is illustrated, wherein the end 11 has a spherical body portion 37 thereabove provided with a threaded aperture 38 in which the cap 16 is threaded. Guide vanes 39 for the valve 19 extend inwardly from the inner wall of the portion 37 for guiding the movement of the valve and permitting it to adjust itself on the seat formed by the shoulder 17 in the same manner as pointed out above with regard to the valve body illustrated in Figs. 1, 2 and 3. In the present arrangement, a cylindrical extension 41 provides an internally threaded outlet for the pressure fluid so that it may be directed through a conduit away from the valve body when the valve 19 is opened. An arcuate lever 42 is pivoted to the bifurcated end of the stem on the pivot 36, the lever having the cam surfaces 34 in engagement with the arcuate surfaces 33 of the cap 16 for producing a raising and lowering of the valve 19 when the lever is manually operated. Otherwise the construction of the valve illustrated in Figs. 4 to 6 is the same as that illustrated in Figs. 1 to 3 inclusive.

In either of the arrangements, a quick-acting poppet valve is provided which may be accurately calibrated. A poppet chamber is provided between the valve and the seat on the body into which the pressure fluid escapes when initially balancing the spring pressure to produce a snap action of the valve and the immediate relief of the pressure. By employing spaced guide vanes for guiding the valve, large escape apertures are provided for the pressure fluid which is quickly relieved so that the tension of the spring may again close the valve 19. In the structure illustrated in Figs. 1, 2 and 3, the pressure is directly relieved outwardly of the passage through the valve, while in the structure illustrated in Figs. 4, 5 and 6, the pressure is relieved at an angle to the passage.

What is claimed is:

1. A valve having a threaded end by which it is secured to a fitting, an enlarged body portion extending from the threaded end and having spaced inwardly directed vanes the radial faces of which fall upon the surface of a cylinder and are provided with a thread on the portion remote from said threaded end, a valve seat provided at the base of the body portion, a valve disposed upon said seat and having a peripheral shoulder which forms a poppet chamber with the valve seat and the body, a cap having an outer peripheral thread supported on the threads of the vanes, and means between said cap and valve for holding the latter on the seat with a predetermined pressure.

2. A valve having a threaded end by which it is secured to a fitting, an enlarged body portion extending from the threaded end having spaced inwardly directed vanes the radial faces of which fall upon the surface of a cylinder, a valve seat provided at the base of the body portion, a valve disposed upon said seat and having a peripheral shoulder which forms a poppet chamber with the valve seat on the body, a cap having an outer peripheral thread falling on the surface of said cylinder and forming a threaded connection in axial alignment with said vanes, and a spring between said cap and said valve for urging the latter on its seat with a predetermined pressure.

3. A valve having a threaded end by which it is secured to a fitting, an enlarged body portion extending from the threaded end having spaced inwardly directed vanes the radial faces of which fall upon the surface of a cylinder, a valve seat provided at the base of the body portion, a valve disposed upon said seat having a face which forms a seal with the valve seat on the body, a cap threaded to the inner ends of said vanes leaving escape openings outwardly thereof, and spring means between said cap and valve for urging said valve against said seat with a predetermined pressure.

4. A valve having a threaded end by which it is secured to a fitting, an enlarged body portion extending from the threaded end having spaced inwardly directed vanes the radial faces of which fall upon the surface of a cylinder, a valve seat provided at the base of the body portion, a valve disposed upon said seat having a face which forms a seal with the valve seat on the body, a cap having a threaded connection with the inner ends of said vanes providing escape openings thereabout, and a spring between said cap and said valve.

5. In a quick-acting poppet valve, a body having a passage therethrough and a thread on one end, a semispherical wall on the opposite end of the body containing an internal seat near the base of said wall, radial vanes extending from the inner surface of said wall above said seat the ends of which are in alignment therewith, a valve having a cylindrical wall guided by said vanes and having a face portion engageable with said internal seat to form a seal therewith, said valve having a recessed shoulder at the peripheral edge of said face portion of the valve forming a poppet chamber with the internal seat and body, a cap threaded to the inner ends of said radial vanes providing escape openings outwardly thereof, a stem extending through said cap, a washer supported on said stem, a spring ring for supporting the valve on said washer, and a spring between said washer and said cap for applying a bias to the valve toward the seat in said body.

6. In a quick-acting poppet valve, a body having a passage therethrough and a thread on one end, a semispherical wall on the opposite end of the body containing an internal seat near the base of said wall, radial vanes extending from the inner surface of said wall above said seat the ends of which are in alignment therewith, a valve having a cylindrical wall guided by said vanes and having a face portion engageable with said internal seat to form a seal therewith, said valve having a recessed shoulder at the peripheral edge of said face portion of the valve forming a poppet chamber with the internal seat and body, a cap threaded to the inner ends of said radial vanes providing escape openings outwardly thereof, a stem extending through said cap, and a spring between said valve and said cap for applying a bias to the valve toward the seat in said body.

7. In a quick-acting poppet valve, a body having a passage therethrough and a thread on one end, a semispherical wall on the opposite end of the body containing an internal seat near the base of said wall, radial vanes extending from the inner surface of said wall above said seat the ends of which are in alignment therewith, a valve having a cylindrical wall guided by said vanes and having a face portion engageable with said internal seat to form a seal therewith, said valve having a recessed shoulder at the peripheral edge of said face portion of the valve forming a poppet chamber with the internal seat and body, a cap threaded to the inner ends of said radial vanes providing escape openings outwardly thereof, a stem extending through said cap, a spring between said valve and said cap for applying a bias to the valve toward the seat in said body, and a pivotal lever on the upper end of the stem having a cam surface for engaging a spherical surface on the cap for producing the raising of the valve when the lever is tilted.

8. In a valve of the quick-acting type, a spherical body having an inlet and an outlet passageway therethrough disposed 90° apart, an internal seat within said body, a valve for engaging said seat, a stem for supporting said valve, a cap of a diameter slightly larger than that of the valve and having the shape of a segment of a sphere forming a part of the body when threaded thereon in alignment with said passgeway, said cap having an aperture through which said stem projects, a spring disposed between said valve and said cap, and means for mounting said valve for universal movement on the end of the stem.

EARL H. LEFFLER.

References Cited in the file of this patent

UNITED STATES PATENTS

| Number | Name | Date |
|---|---|---|
| 177,564 | Rudd | May 16, 1876 |
| 382,329 | Seymour | May 8, 1888 |
| 769,512 | Tippett | Sept. 6, 1904 |
| 825,380 | Coale | July 10, 1906 |
| 917,920 | Blanchard | Apr. 13, 1909 |
| 948,361 | Webb | Feb. 8, 1910 |
| 1,095,105 | Goodwin | Apr. 28, 1914 |
| 1,139,463 | Taylor | May 11, 1915 |
| 1,551,547 | Darling | Sept. 1, 1925 |
| 2,290,059 | Martin-Hurst | July 14, 1942 |
| 2,490,219 | Kmiecik | Dec. 6, 1949 |